United States Patent
Ozcan et al.

(10) Patent No.: US 12,488,431 B2
(45) Date of Patent: Dec. 2, 2025

(54) DEEP NEURAL NETWORK FOR HOLOGRAM RECONSTRUCTION WITH SUPERIOR EXTERNAL GENERALIZATION

(71) Applicant: THE REGENTS OF THE UNIVERSITY OF CALIFORNIA, Oakland, CA (US)

(72) Inventors: Aydogan Ozcan, Los Angeles, CA (US); Hanlong Chen, Los Angeles, CA (US); Luzhe Huang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 63 days.

(21) Appl. No.: 18/637,317

(22) Filed: Apr. 16, 2024

(65) Prior Publication Data
US 2024/0354907 A1    Oct. 24, 2024

Related U.S. Application Data (60) Provisional application No. 63/497,420, filed on Apr. 20, 2023.

(51) Int. Cl.
*G06T 5/60* (2024.01)
*G03H 1/00* (2006.01)
(Continued)

(52) U.S. Cl.
CPC ............ *G06T 5/60* (2024.01); *G03H 1/0005* (2013.01); *G03H 1/26* (2013.01); *G06T 5/50* (2013.01);
(Continued)

(58) Field of Classification Search
CPC .... G06T 5/60; G06T 5/50; G06T 5/73; G06T 2207/10056; G06T 2207/20021;
(Continued)

(56) References Cited

U.S. PATENT DOCUMENTS 11,222,415 B2    1/2022 Ozcan et al.
11,237,059 B1 *  2/2022 Ersoy .................. G03H 1/0465
(Continued)

FOREIGN PATENT DOCUMENTS

WO    WO 2019103909 A1    5/2019
WO    WO 2019191697 A1    10/2019
(Continued)

OTHER PUBLICATIONS

Waheb Bishara et al., Lensfree on-chip microscopy over a wide field-of-view using pixel super-resolution, Optics Express, May 24, 2010, vol. 18, No. 11, 1181-1191.
(Continued)

*Primary Examiner* — Timothy R Newlin
(74) *Attorney, Agent, or Firm* — VISTA IP LAW GROUP LLP (57) ABSTRACT

A deep learning framework, termed Fourier Imager Network (FIN) is disclosed that can perform end-to-end phase recovery and image reconstruction from raw holograms of new types of samples, exhibiting success in external generalization. The FIN architecture is based on spatial Fourier transform modules with the deep neural network that process the spatial frequencies of its inputs using learnable filters and a global receptive field. FIN exhibits superior generalization to new types of samples, while also being much faster in its image inference speed, completing the hologram reconstruction task in ~0.04 s per 1 $mm^2$ of the sample area. Beyond holographic microscopy and quantitative phase imaging applications, FIN and the underlying neural network archi-
(Continued)

tecture may open up various new opportunities to design broadly generalizable deep learning models in computational imaging and machine vision fields.

20 Claims, 6 Drawing Sheets

(51) Int. Cl.
    *G03H 1/26* (2006.01)
    *G06T 5/50* (2006.01)
    *G06T 5/73* (2024.01)
(52) U.S. Cl.
    CPC ......... *G06T 5/73* (2024.01); *G03H 2001/005* (2013.01); *G03H 2210/55* (2013.01); *G03H 2226/02* (2013.01); *G03H 2227/03* (2013.01); *G06T 2207/10056* (2013.01); *G06T 2207/20021* (2013.01); *G06T 2207/20081* (2013.01); *G06T 2207/20084* (2013.01); *G06T 2207/30024* (2013.01)
(58) Field of Classification Search
    CPC . G06T 2207/20081; G06T 2207/20084; G06T 2207/30024; G03H 1/0005; G03H 1/26; G03H 2001/005; G03H 2210/55; G03H 2226/02; G03H 2227/03; G03H 1/0808; G03H 1/0866; G03H 1/0443; G03H 2001/0883; G06N 3/045; G06N 3/0464; G06N 3/08
    See application file for complete search history.

(56) References Cited

U.S. PATENT DOCUMENTS

| | | | |
|---|---|---|---|
| 11,262,286 B2 | 3/2022 | Ozcan et al. | |
| 11,514,325 B2 | 11/2022 | Ozcan et al. | |
| 11,625,002 B2* | 4/2023 | Hong | G06T 7/60 348/40 |
| 11,740,587 B2* | 8/2023 | Yang | G03H 1/0808 359/9 |
| 11,756,197 B2* | 9/2023 | Ahn | G01R 33/5608 |
| 11,893,739 B2 | 2/2024 | Ozcan et al. | |
| 11,893,779 B2 | 2/2024 | Ozcan et al. | |
| 11,915,360 B2 | 2/2024 | Ozcan et al. | |
| 2019/0294108 A1 | 9/2019 | Ozcan et al. | |
| 2019/0317451 A1* | 10/2019 | Supikov | G06F 18/214 |
| 2019/0333199 A1 | 10/2019 | Ozcan et al. | |
| 2020/0192287 A1* | 6/2020 | Chakravarthula | G03H 1/0866 |
| 2020/0284649 A1* | 9/2020 | Baudat | G01J 9/00 |
| 2020/0340901 A1 | 10/2020 | Ozcan et al. | |
| 2020/0340908 A1* | 10/2020 | Cornelis | G03H 1/0443 |
| 2021/0043331 A1 | 2/2021 | Ozcan et al. | |
| 2021/0264214 A1 | 8/2021 | Ozcan et al. | |
| 2021/0295152 A1* | 9/2021 | Bouman | G06N 3/04 |
| 2021/0326690 A1* | 10/2021 | Pégard | G06V 10/454 |
| 2021/0356258 A1* | 11/2021 | Chen | G06N 3/045 |
| 2021/0374381 A1 | 12/2021 | Ozcan et al. | |
| 2022/0012850 A1* | 1/2022 | Ozcan | G06N 3/084 |
| 2022/0058776 A1 | 2/2022 | Ozcan et al. | |
| 2022/0114711 A1 | 4/2022 | Ozcan et al. | |
| 2022/0121940 A1 | 4/2022 | Ozcan et al. | |
| 2022/0122313 A1 | 4/2022 | Ozcan et al. | |
| 2022/0206434 A1 | 6/2022 | Ozcan et al. | |
| 2022/0299525 A1 | 9/2022 | Ozcan et al. | |
| 2023/0024787 A1* | 1/2023 | Ozcan | G06N 3/0985 |
| 2023/0030424 A1 | 2/2023 | Ozcan et al. | |
| 2023/0060037 A1 | 2/2023 | Ozcan et al. | |
| 2023/0085827 A1 | 3/2023 | Ozcan et al. | |
| 2023/0236545 A1* | 7/2023 | Yu | G03H 1/06 359/22 |
| 2023/0251603 A1* | 8/2023 | Lee | G06N 3/0475 348/40 |
| 2023/0280692 A1* | 9/2023 | Ersoy | G03H 1/0443 359/9 |
| 2023/0367994 A1* | 11/2023 | Alesiani | G06N 3/0985 |
| 2023/0376741 A1* | 11/2023 | Bowen | G06N 3/045 |
| 2025/0216489 A1* | 7/2025 | Christodoulou | G06N 3/08 |

FOREIGN PATENT DOCUMENTS

| | | |
|---|---|---|
| WO | WO 2019236569 A1 | 12/2019 |
| WO | WO 2020018154 A1 | 1/2020 |
| WO | WO 2020082030 A1 | 4/2020 |
| WO | WO 2020102546 A1 | 5/2020 |
| WO | WO 2020139835 A1 | 7/2020 |
| WO | WO 2020219468 A1 | 10/2020 |
| WO | WO 2020242993 A1 | 12/2020 |
| WO | WO 2021133847 A1 | 7/2021 |
| WO | WO 2021154876 A1 | 8/2021 |
| WO | WO 2021188839 A1 | 9/2021 |
| WO | WO 2022173848 A1 | 8/2022 |
| WO | WO 2022256206 A1 | 12/2022 |
| WO | WO 2023283091 A1 | 1/2023 |
| WO | WO 2023107844 A1 | 6/2023 |
| WO | WO 2023215688 A1 | 11/2023 |
| WO | WO 2024006670 A2 | 3/2024 |
| WO | WO 2024050321 A1 | 3/2024 |

OTHER PUBLICATIONS

Alexandre Goy et al., Low Photon Count Phase Retrieval Using Deep Learning, Physical Reviewletters, 121, 243902 (2018).

Alon Greenbaum et al., Field-portable wide-field microscopy of dense samples using multi-height pixel super-resolution based lensfree imaging, Lab Chip, 2012, 12, 1242-1245.

Alon Greenbaum et al., Maskless imaging of dense samples using pixel super-resolution based multi-height lensfree on-chip microscopy, Optics Express, Jan. 30, 2012, vol. 20, No. 3, 3129-3143.

Luzhe Huang et al., Recurrent neural network-based volumetric fluorescence microscopy, Light: Science & Applications (2021) 10:62 (16 pages).

Justin Johnson et al., Perceptual Losses for Real-Time Style Transfer and Super-Resolution, (2016), (17 pages).

Diederik P. Kingma et al., ADAM: A Method for Stochastic Optimization, Published as a conference paper at ICLR 2015, arXiv:1412.6980v9 [cs.LG] Jan. 30, 2017, (15 pages).

Zongyi Li et al., Fourier Neural Operator for Parametric Partial Differential Equations, Published as a conference paper at ICLR 2021, arXiv:2010.08895v3 [cs.LG] May 17, 2021, (16 pages).

Ilya Loshchilov et al., SGDR: Stochastic Gradient Descent with Warm Restarts, Published as a conference paper at ICLR 2017, arXiv:1608.03983v5 [cs.LG] May 3, 2017, (16 pages).

Yair Rivenson et al., Sparsity-based multi-height phase recovery in holographic microscopy, Scientific Reports, 6:37862, DOI: 10.1038/srep37862, (2016), (9 pages).

Yair Rivenson et al., Phase recovery and holographic image reconstruction using deep learning in neural networks, Light: Science & Applications (2018) 7, 17141; doi: 10.1038/lsa.2017.141.

Yair Rivenson et al., Deep learning in holography and coherent imaging, Light: Science & Applications (2019) 8:85.

Hao Wang et al., eHoloNet: a learning-based end-to-end approach for in-line digital holographic reconstruction, Optics Express, vol. 26, No. 18, Sep. 3, 2018, 22603-22614.

Yichen Wu et al., Extended depth-of-field in holographic imaging using deep-learning-based autofocusing and phase recovery, Optica, vol. 5, No. 6, Jun. 2018, 704-710.

Yichen Wu et al., Bright-field holography: cross-modality deep learning enables snapshot 3D imaging with bright-field contrast using a single hologram, Light: Science & Applications (2019) 8:25.

Yulun Zhang et al., Image Super-Resolution Using Very Deep Residual Channel Attention Networks, ECCV (2018), SpringerLink:https//link.springer.com/conference/eccv.

Yibo Zhang et al., Edge sparsity criterion for robust holographic (56) References Cited

OTHER PUBLICATIONS autofocusing, Optics Letters, vol. 42, No. 19, Oct. 1, 2017, 3824-3827.

* cited by examiner

DEEP NEURAL NETWORK FOR HOLOGRAM RECONSTRUCTION WITH SUPERIOR EXTERNAL GENERALIZATION

RELATED APPLICATION

This application claims priority to U.S. Provisional Patent Application No. 63/497,420 filed on Apr. 20, 2023 which is hereby incorporated by reference. Priority is claimed pursuant to 35 U.S.C. § 119 and any other applicable statute.

TECHNICAL FIELD

The technical field generally relates to deep learning-based image reconstruction methods. More specifically, the technical field relates to a deep neural network that uses spatial Fourier transform modules that process the spatial frequencies of its inputs using learnable filters and a global receptive field. The deep neural network is able to rapidly implement phase recovery and holographic image reconstruction from raw holograms of new (different) types of samples, achieving unprecedented success in external generalization.

BACKGROUND

Digital holography provides unique advantages in microscopic imaging, by reconstructing the complex optical fields of input samples. Due to the missing phase information, various computational approaches have been developed to digitally reconstruct holograms. Recent work has also utilized deep neural networks to reconstruct the complex sample field from a hologram in a single forward inference step, achieving an image reconstruction quality comparable to iterative hologram reconstruction algorithms that are based on physical wave propagation. Some of the earlier results have also reported simultaneous performance of phase retrieval and autofocusing in a single network architecture, demonstrating holographic imaging over an extended depth-of-field. In these earlier demonstrations, various deep network architectures, such as e.g., U-net-based convolutional neural networks (CNNs), recurrent neural networks (RNNs), as well as generative adversarial networks (GANs) have been proven to be effective for phase retrieval and hologram reconstruction for new (unseen) objects that belong to the same sample type of interest used during the training process. Stated differently, this earlier body of work has successfully demonstrated the "internal generalization" of the hologram reconstruction and phase retrieval networks to new objects of the same sample type as used in training.

On the other hand, "external generalization" to new objects from entirely new types of samples, never seen by the network before, remains a major challenge for deep neural networks, which might lead to image reconstruction degradation or hallucinations. Some studies have explored using transfer learning to address this challenge, which requires fine-tuning the network using a subset of the new types of samples. In addition to this external generalization issue, it is, in general, difficult for CNN-based image reconstruction networks to accurately reconstruct raw holograms of samples due to the limited receptive field of convolutional layers, which casts another challenge considering the relatively large scale of holographic diffraction patterns of samples. As a result, existing end-to-end hologram reconstruction deep neural networks could only achieve decent reconstruction performance on relatively sparse samples. Alternatively, a pre-processing step, such as zero phase-padded free space propagation (FSP), has also been utilized to better deal with this issue, which requires a precise physical forward model with the correct estimate of the axial propagation distance.

SUMMARY

In one embodiment, an end-to-end deep neural network is disclosed for holographic image construction. This deep neural network, termed Fourier Imager Network (FIN), is able to rapidly implement phase recovery and holographic image reconstruction from raw holograms of new (i.e., different) types of samples, achieving unprecedented success in external generalization. This framework takes in two or more input raw holograms (in some embodiments only a single input raw hologram is needed) captured at different sample-to-sensor distances without any pre-processing steps involved. By comprehensively utilizing the global spatial-frequency information processed by its trained spatial Fourier transform (SPAF) modules disposed within the deep neural network, FIN accurately reconstructs the complex field of the specimen, successfully demonstrating external generalization to new types of samples never used during its training. To experimentally demonstrate the success of this approach, FIN models were trained using human lung tissue samples (i.e., thin histopathology sections of connected tissue) and blindly tested the resulting trained FIN models on prostate and salivary gland tissue sections as well as Pap smear samples without compromising the image reconstruction quality. Compared to iterative hologram reconstruction algorithms based on wave propagation between different measurement planes, FIN is >27-fold faster to reconstruct an image. Compared to existing CNN-based deep learning models, the FIN-based deep neural network exhibits an unprecedented generalization performance, and is also much faster in its inference speed. FIN can be widely used in various image reconstruction and enhancement tasks commonly employed in the computational microscopy field. In addition to coherent imaging, FIN can be applied to other image reconstruction or enhancement tasks in different imaging modalities, including e.g., fluorescence and brightfield microscopy.

In one embodiment, a method of performing phase recovery and holographic image reconstruction from holographic amplitude images of a test sample includes the operations of: obtaining one or more holographic amplitude images of the test sample at one or more sample-to-sensor distances using an image sensor; and providing a trained deep neural network that is executed using one or more processors, wherein the trained deep neural network comprises a plurality of trained spatial Fourier transform (SPAF) modules, each SPAF module configured to perform a two-dimensional (2D) Discrete Fourier transform from a spatial domain to a frequency domain followed by a linear transformation in the frequency domain followed by an inverse 2D Discrete Fourier transform to the spatial domain, wherein the trained deep neural network is trained with holographic amplitude images obtained of a plurality of training samples at one or more sample-to-sensor distances and their corresponding in-focus phase-recovered ground truth images to optimize learnable parameters in the deep neural network, wherein the trained deep neural network is configured to receive one or more holographic amplitude images of the test sample obtained with the image sensor and outputs an in-focus complex-valued output image of the test sample that includes both phase information and amplitude information of the test sample.

In another embodiment, a system for performing phase recovery and holographic image reconstruction from holographic amplitude images of a test sample includes a microscopy device having a light source and an image sensor, the image sensor configured to capture one or more holographic amplitude images of the test sample at one or more sample-to-sensor distances. The system further includes a computing device comprising one or more processors configured to execute software containing a trained deep neural network, wherein the trained deep neural network comprises a plurality of trained spatial Fourier transform (SPAF) modules, each SPAF module configured to perform a two-dimensional (2D) Discrete Fourier transform from a spatial domain to a frequency domain followed by a linear transformation in the frequency domain followed by an inverse 2D Discrete Fourier transform to the spatial domain, wherein the trained deep neural network is trained with holographic amplitude images obtained of a plurality of training samples at one or more sample-to-sensor distances and their corresponding in-focus phase-recovered ground truth images to optimize learnable parameters in the deep neural network, wherein the trained deep neural network is configured to receive the one or more holographic amplitude images of the test sample obtained with the image sensor and outputs an in-focus complex-valued output image of the test sample that includes phase information and amplitude information of the test sample.

BRIEF DESCRIPTION OF THE DRAWINGS

FIG. 5 illustrates a comparison of amplitude and phase RMSE values using different combinations of $z_{2,1}$ and $z_{2,2}$.

Each number in the FIN region refers to an independent network model trained using the corresponding $z_{2,1}$ and $z_{2,2}$ combination (M=2). The ground truth for each sample is obtained through the MH-PR algorithm that used M=8 raw holograms captured at different sample-to-sensor distances. GT: Ground Truth.

DETAILED DESCRIPTION OF ILLUSTRATED EMBODIMENTS

Figure 1:
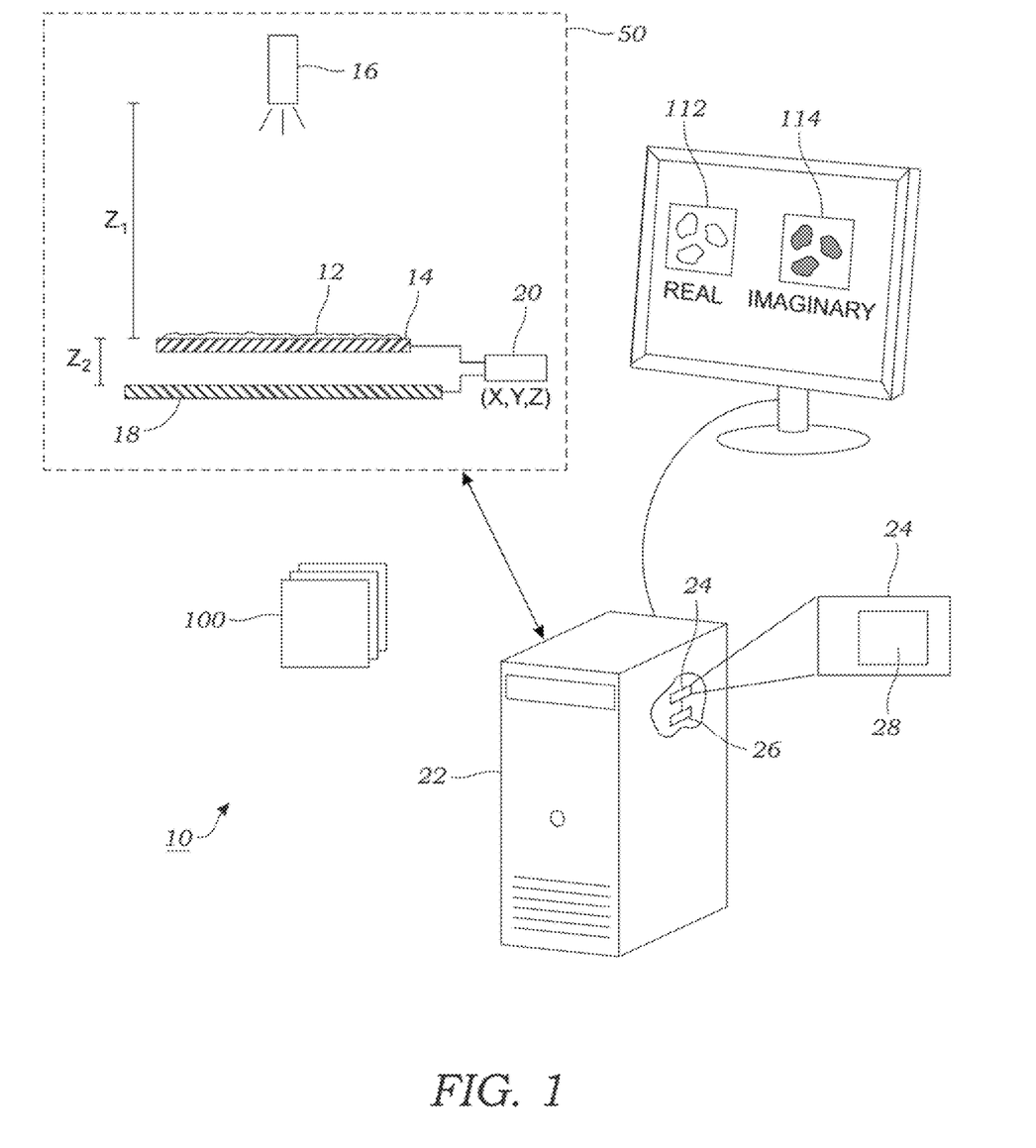
FIG. 1 schematically illustrates a system for performing phase recovery and holographic image reconstruction from holographic amplitude images of a sample.

With reference to FIG. 1, a system 10 for performing phase recovery and holographic image reconstruction from one or more holographic amplitude images 100 of a test sample 12 is disclosed. A lens-free in-line holographic microscope 50 is used to obtain raw holographic amplitude images 100 of the test sample 12. The test sample 12 may include a biological sample such as tissue or tissue sections. The test sample 12 may also include cells, bacteria, viruses, fungi, pathogens, pollens, model organisms, particles, particulate matter, plastics, dust, allergens, organic or inorganic materials. In the embodiments described herein, the test sample 12 includes stained tissue sections of different types of tissue (e.g., lung, prostrate). The test sample 12 may also include other biological samples such as smears (e.g., Pap smear). Stains may include commonly used stains used for tissues and biological samples. Examples include Masson's trichrome (MT), hematoxylin & eosin (HE), Pap smear stains. The test sample 12 is located on a sample holder 14. The sample holder 14 is optically transparent such a glass or plastic slide or the like. The microscope 50 includes a light source 16 may include a broadband light source. An example light source 16 includes a broadband laser with an acousto-optic tunable filter (AOTF). Other light sources may include laser diodes or light emitting diodes. As seen in FIG. 1, the light source 16 is aligned vertically above the test sample 12 and illumination of the of the test sample 12 casts holograms or holographic patterns (e.g., holographic amplitude images 100) which are captured by an image sensor 18 of the microscope 50. The image sensor 18 may include a CMOS image sensor such as a color (RGB) image sensor as used herein.

The test sample 12 was directly placed between the light source 16 and the image sensor 18 such that the sample-to-source distance ($z_1$) was about 10 cm, and the sample-to-sensor distance ($z_2$) ranged from 300 μm to 600 μm. In this regard, $z_1 \gg z_2$ for the configuration illustrated in FIG. 1. A moveable stage 20 is provided to adjust the z distance between the test sample 12 and the image sensor 18 (i.e., the sample-to-sensor distance). The moveable stage 20 may move one or both of the test sample 12 and image sensor 18. In one example, the image sensor 18 is moved leaving the test sample 12 stationary. The moveable stage 20 may also provide relatively motion in the x, y plane between the test sample 12 and the image sensor 18. This is used, for example, to create pixel super-resolved images of the test sample 12. The moveable stage 20 may also move in the z direction to obtain raw holographic amplitude images 100 of the test sample 12 at different sample-to-sensor distances.

Figure 2A:
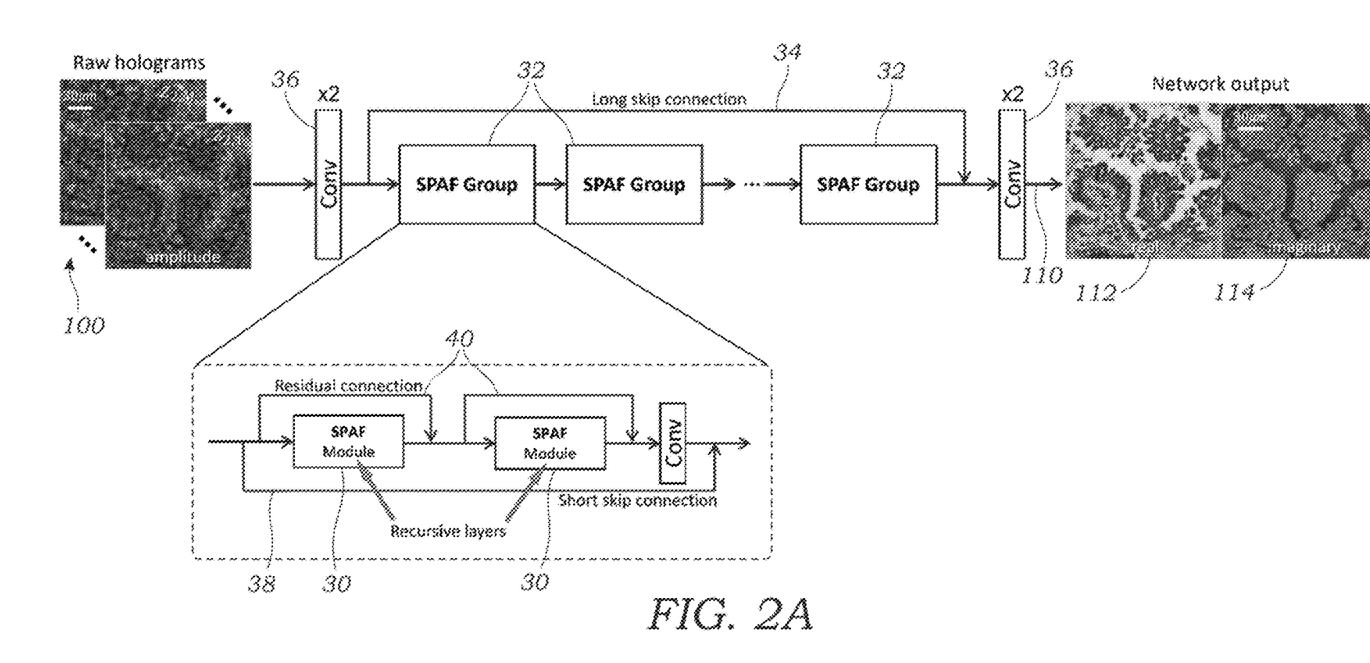
FIG. 2A illustrates the model architecture of FIN. The raw input holograms are captured at different sample-to-sensor distances $z_{2,i}$, i=1, ..., M.
Figure 2B:
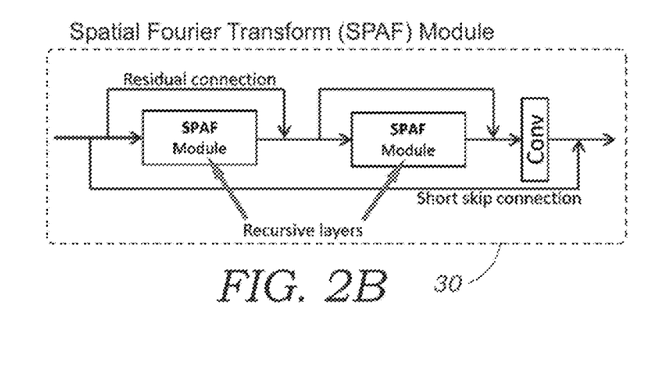
FIG. 2B illustrates the structure of the SPAF Module, where W stands for the element-wise multiplication in the frequency domain.
Figure 3:
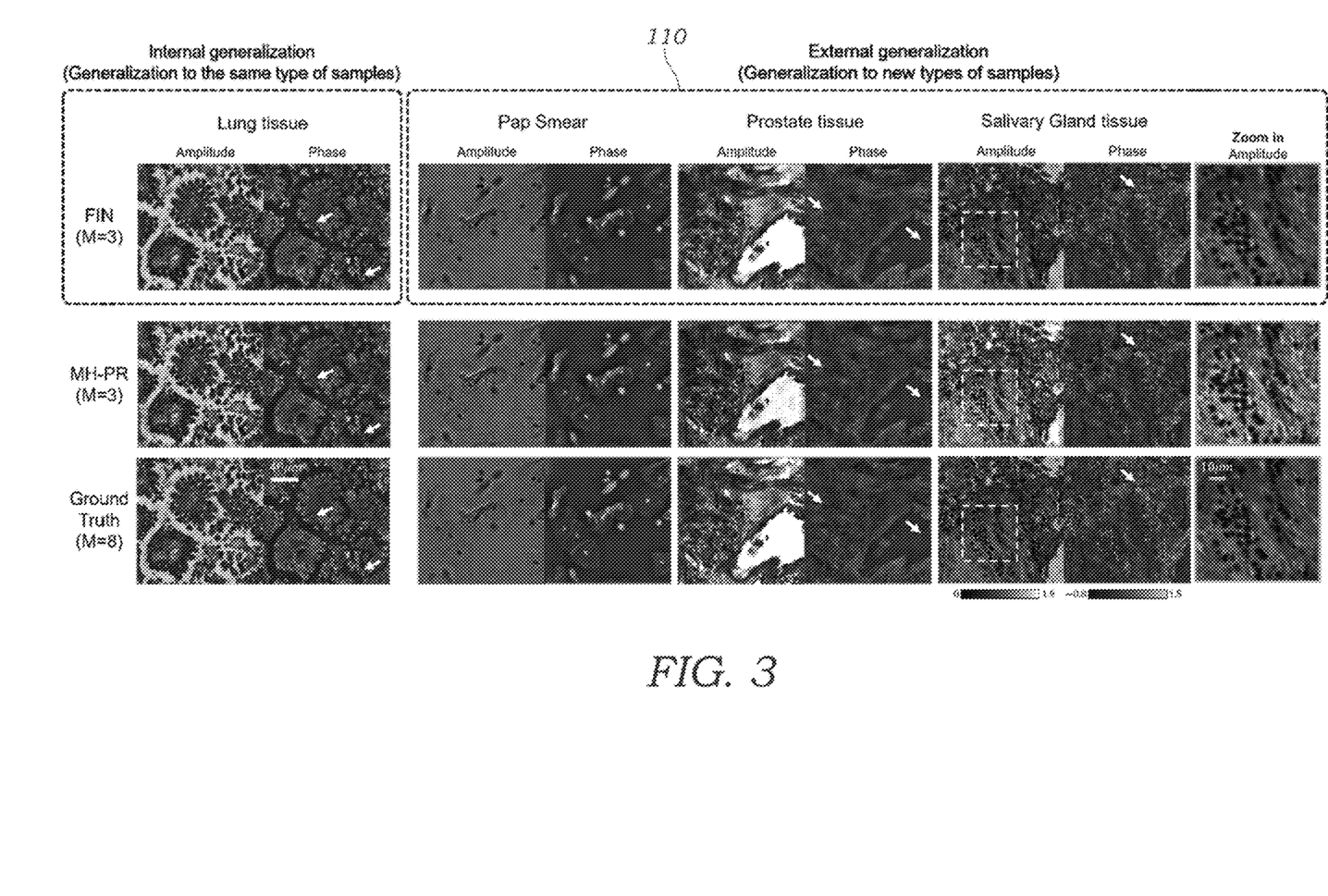
FIG. 3 illustrates the internal and external generalization of FIN. Each output of FIN and MH-PR algorithm is generated using the same raw holograms (M=3). FIN was trained on human lung tissue samples only, and the internal generalization part uses unseen lung tissue holograms from new patients. The external generalization directly applies the same trained FIN model to new types of samples, i.e., Pap smear, prostate tissue, and salivary gland tissue samples, never seen by the network before. The ground truth for each sample is obtained through the MH-PR algorithm that used M=8 raw holograms captured at different sample-to-sensor distances.
Figures 4A, 4B:
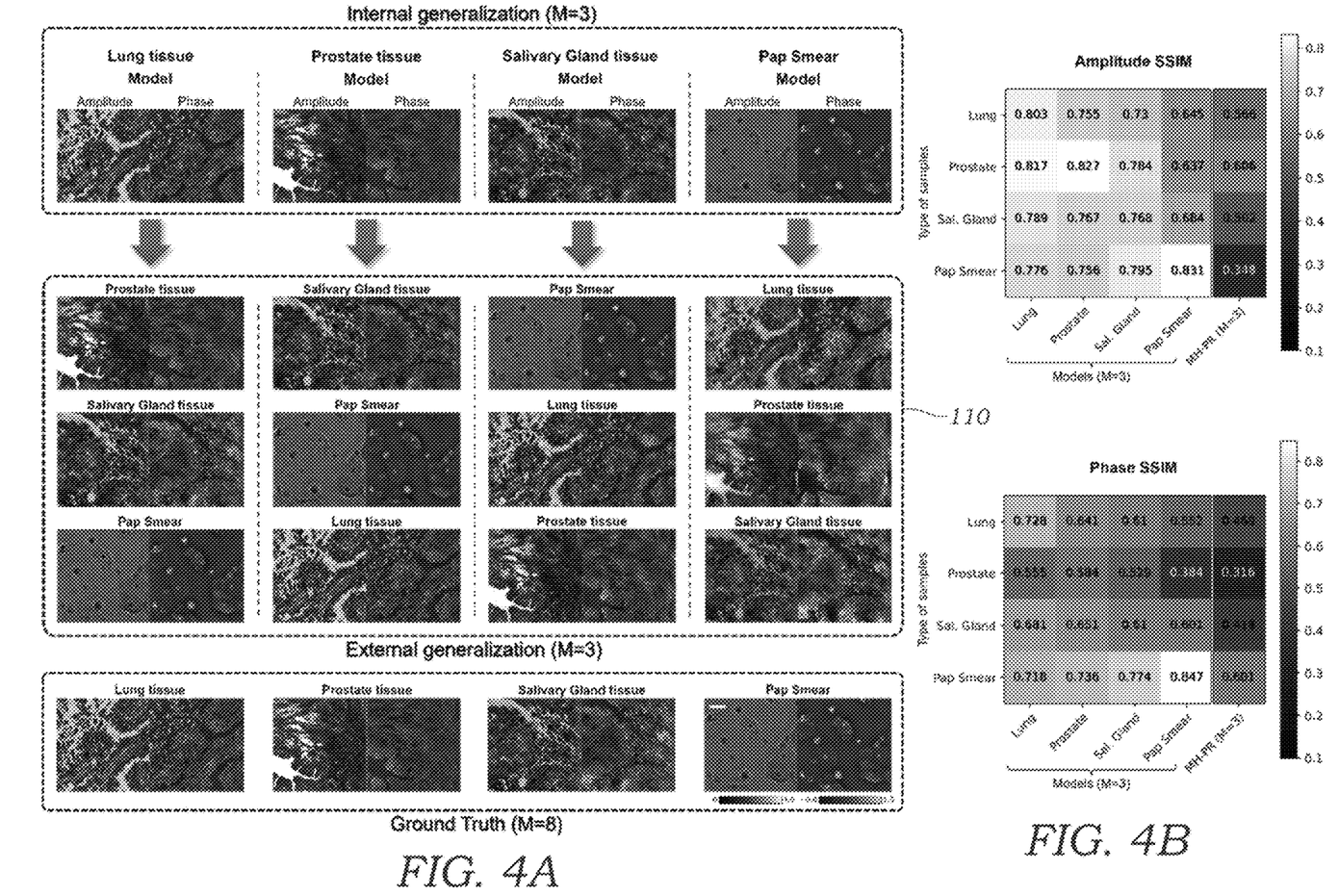
FIG. 4A illustrates the generalization of FIN on different types of training samples. Each FIN model is separately trained using the raw holograms (M=3) of the corresponding sample type. Scale bar: 30 μm.
FIG. 4B illustrates a comparison of the amplitude and phase SSIM values corresponding to the hologram reconstruction performed by different FIN models that are trained and tested with different types of samples. The ground truth for each sample is obtained through the MH-PR algorithm that used M=8 raw holograms captured at different sample-to-sensor distances.

A computing device 22 is provided and is used to control the light source 16 and moveable stage 20. The computing device 22 also is used to process the raw hologram images or image patterns as explained herein. These raw hologram images (or their pixel super-resolved version) are holographic amplitude images 100 of the test sample 12 and are then input to software 24 executed by one or more processors 26. The software 24 includes a trained deep neural network 28 therein. In some embodiments, the software 24 may also convert raw hologram images 100 or image patterns into pixel super-resolved images. The trained deep neural network 28 includes a plurality of trained spatial Fourier transform (SPAF) modules 30 as seen in FIGS. 2A-2B. The SPAF modules 30 are arranged within groups 32 in the trained deep neural network 28 with a long skip 34 connection to form the large-scale residual connection, in conjunction with two (2) 1×1 convolutional layers 36 at the head and tail of the trained deep neural network 28. Each SPAF module 30 is configured to perform a 2D Discrete Fourier transform from a spatial domain to a frequency domain followed by a linear transformation in the frequency domain followed by an inverse 2D Discrete Fourier transform to the spatial domain.

Each SPAF group 32, in one particular embodiment, contains two recursive SPAF modules 30, which share the same parameters to improve the network capacity without significantly enlarging the size of the network. In other embodiments, however, SPAF modules 30 in each SPAF group 32 may have separate parameters and more SPAF modules 30 can be entailed in one single group 32. A short skip connection 38 is introduced for every SPAF group 32 to form the middle-scale residual connection, and a small-scale residual connection 40 is used to connect the inputs and outputs of each SPAF module 30.

The trained deep neural network 28 is trained with holographic amplitude images 100 obtained of training samples at one or more sample-to-sensor distances (22) and their corresponding in-focus phase-recovered ground truth (GT) images to optimize learnable parameters in each SPAF module 30 and elsewhere in the deep neural network 28, wherein the trained deep neural network 28 is configured to receive the one or more holographic amplitude images 100 of the test sample 12 obtained with the image sensor 18 and outputs an in-focus complex-valued output image 110 of the test sample 12 that includes both the phase information and amplitude information of the test sample 12 (see e.g., FIGS. 2A, 3, 4A, 6). The complex-valued output image 110 may be used to display, for example, real (amplitude) images 112 and/or imaginary (phase) 114 images as seen, for example, in FIG. 1. The training samples used to train the deep neural network 28 may be of the same or different type of test sample 12. Thus, in one embodiment, the trained deep neural network 28 is trained on training samples that are of a different sample type that are ultimately fed (i.e., test samples 12) to the trained deep neural network 28. An example of this is training the deep neural network 18 with lung tissue but then inputting one or more holographic amplitude images 100 of prostate tissue as the test sample 12.

The particular FIN-based architecture that was used for the results contained herein is a trained deep neural network 28 that employs SPAF groups 32 that each contain two recursive SPAF modules 30 that use Fourier transformation from the spatial domain to the frequency domain where a linear transformation (with learnable parameters) is applied in the frequency domain. After the application of the linear transformation, the inverse Fourier transform is used to obtain the processed data back into the spatial domain (FIG. 2B). In addition to the learnable parameters of the SPAF modules 30, the convolutional layers 36 include learnable kernels, and the PRELU includes learnable parameters during training. The FIN-based architecture of the trained deep neural network 28 exhibits superior generalization to new types of samples 12, while also being much faster in its image inference speed, completing the hologram reconstruction task in ~0.04 s per 1 mm$^2$ of the sample area.

Experimental

Results

FIN provides an end-to-end solution for phase recovery and holographic image reconstruction, and its architecture is schematically presented in FIGS. 2A-2B (also described in Methods section herein). To acquire raw holograms 100 of specimens or test samples 12, a lens-free in-line holographic microscope 50 (FIG. 1) was used, as detailed in the Methods section, to image transmissive samples 12, such as human tissue samples and Pap smears, using a set of sample-to-sensor distances, i.e., $z_{2,i}$, i=1, . . . , M. The input images 100 to FIN consist of M intensity-only raw holograms captured at $z_{2,1}$ to $z_{2,M}$ and the network outputs 110 include the reconstructed real and imaginary images 112, 114 of the sample 12, revealing the complex-valued sample field. The corresponding ground truth images for supervised learning of FIN are obtained using an iterative multi-height phase retrieval (MH-PR) algorithm as described in Greenbaum, A. et al., Maskless imaging of dense samples using pixel super-resolution based multi-height lensfree on-chip microscopy, Opt. Express 20, 3129-3143 (2012), incorporated by reference herein, with M=8 holograms acquired at different sample-to-sensor distances.

To demonstrate the success of FIN, it was trained using raw holograms 100 of human lung tissue sections and tested the trained model on four different types of samples: (1) lung tissue samples from different patients never used in the training set (testing internal generalization), (2) Pap smear samples, (3) prostate tissue samples, and (4) salivary gland tissue samples, where (2,3,4) test external generalization, referring to new types of samples 12. The $z_{2,i}$ distances that were used in these holographic imaging experiments were 300, 450, and 600 μm (M=3). After its training, the blind testing results (FIG. 3) reveal that FIN-based system 2 can not only reconstruct new lung tissue sections from new patients (internal generalization) but also achieves a strong external generalization performance on new sample types never seen by the deep neural network 28 before. Furthermore, compared to the output of the multi-height, phase retrieval (MH-PR) algorithm using the same input (raw hologram) data (M=3), FIN is ~27.3 times faster in its inference speed per image (see Table 1) and delivers better reconstruction quality on all the test samples 12, as highlighted by the arrows and the zoomed-in regions in FIG. 3.

TABLE 1

|  | Number of trainable parameters | Inference time (s/mm$^2$) | Parallelized inference time (s/mm$^2$) |
|---|---|---|---|
| FIN (M = 3) | 11.5M | 0.52 | 0.04 |
| FIN | 11.5M | 0.56 | 0.04 |

TABLE 1-continued

|  | Number of trainable parameters | Inference time (s/mm$^2$) | Parallelized inference time (s/mm$^2$) |
|---|---|---|---|
| (M = 4) |  |  |  |
| RH-M (M = 3) | 14.1M | 4.84 | 1.96 |
| RH-M (M = 4) | 14.1M | 5.76 | 2.08 |
| MH-PR (M = 2) | N/A | 10.36 | N/A |
| MH-PR (M = 3) | N/A | 14.19 | N/A |

Table 1: The parallelized inference time is measured when the batch size is set to 20 for both FIN and RH-M.

To further showcase the generalization ability of FIN, four FIN deep neural network models 28 were separately trained using lung tissue, prostate tissue, salivary gland tissue, and Pap smear hologram datasets (i.e., one type of sample for each network model 28), and blindly tested the trained models 28 on unseen FOVs from four types of samples 12 using M=3 raw holograms for each FOV. Similar to the conclusions reported in FIG. 3, FIG. 4A also shows that the FIN model 28 trained using each sample type can successfully generalize to other types of samples 12. Even when the FIN system 10 was only trained using relatively sparse samples 12 such as Pap smear slides, the resulting network model 28 successfully generalized to reconstruct the raw holograms 100 of connected tissue sections that significantly deviate from the structural distribution and sparsity observed in Pap smear samples. The success of the reconstruction performance of FIN system 2 was also quantified using the structural similarity index (SSIM) across all four FIN networks 28 that were trained using different types of samples 12 (see FIG. 4B), demonstrating the superior generalization of these FIN models 28 regardless of the distribution shifts observed between the training and testing data.

Figure 5:
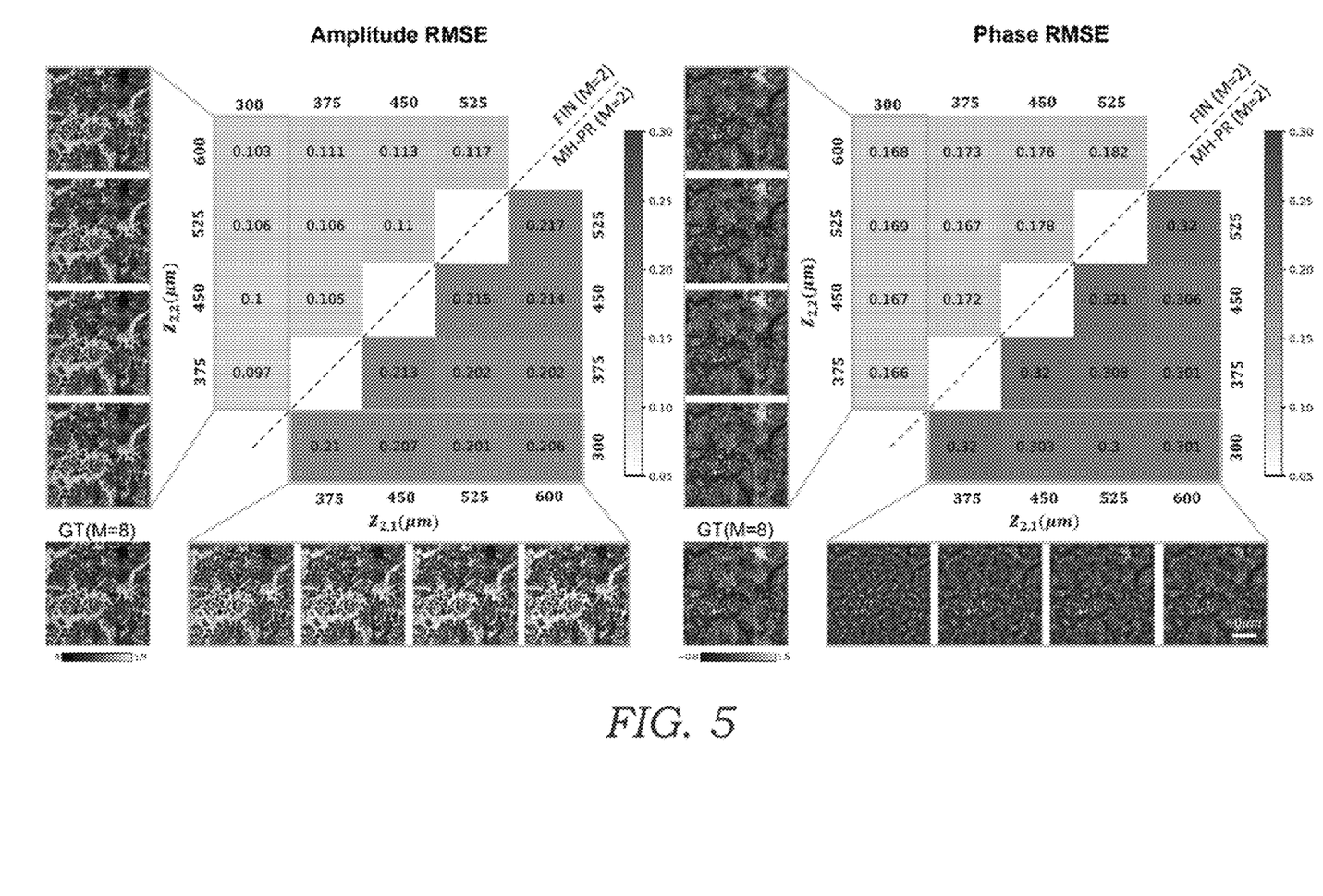
Figure 6:
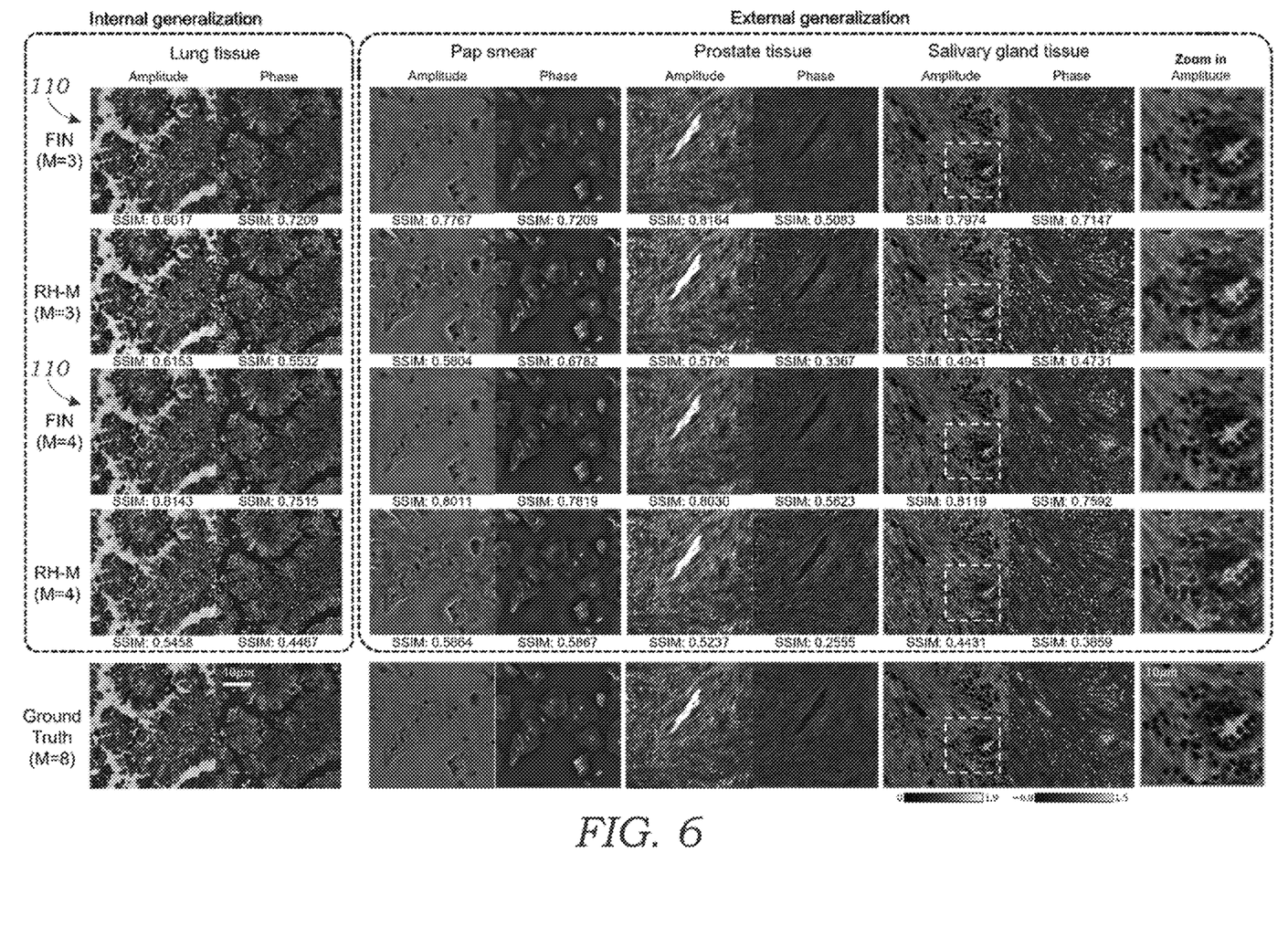
FIG. 6 illustrates a comparison of the generalization capabilities of FIN and RH-M. Both FIN and RH-M are trained using only human lung tissue samples and the internal generalization part uses unseen FOVs from new lung tissue samples (new patients). The external generalization tests directly apply the same trained networks to new types of samples, i.e., Pap Smear, prostate tissue and salivary gland tissue samples. The ground truth for each sample is obtained through the MH-PR algorithm that used M=8 raw holograms captured at different sample-to-sensor distances.

Next, the hologram reconstruction performance of the FIN system 10 was evaluated when only two input holograms 100 were measured, i.e., M=2. For this, ten different FIN models 28 were trained from scratch using the same human lung tissue sections but with different sets of $z_{2,1}$ and $z_{2,2}$, such that the sample-to-sensor distances for different FIN models 28 were different. These trained FIN models 28 were then blindly tested on new lung tissue sections (samples 12) from new patients (internal generalization); FIGS. 5A and 5B report the amplitude (FIG. 5A) and phase (FIG. 5B) root mean square error (RMSE) of the reconstructed holographic images 112, 114 generated by FIN (M=2) and MH-PR (M=2) for different combinations of $z_{2,1}$ and $z_{2,2}$. Both the amplitude and phase RMSE values show that the FIN system 2 achieves a significant reconstruction quality improvement compared to MH-PR (M=2), and the RMSE values of FIN models 28 are consistently better with different sample-to-sensor distances varying from 300 μm to 600 μm. The visualization of the reconstructed holograms shown in FIGS. 5A and 5B further confirms the same conclusion that FIN achieves consistently better image reconstruction compared to MH-PR for various combinations of $z_{2,1}$ and $z_{2,2}$. It was also confirmed that the same conclusions apply to the external generalization tests of FIN (M=2).

In addition to MH-PR based comparisons, the performance analysis was also extended to other deep learning-based phase retrieval and hologram reconstruction methods. For this additional set of comparisons, a state-of-the-art deep learning model was used based on a recurrent convolutional neural network, termed RH-M, that was developed for multi-height holographic image reconstruction. See Huang, L. et al., Holographic Image Reconstruction with Phase Recovery and Autofocusing Using Recurrent Neural Networks, ACS Photonics 8, 1763-1774 (2021), which is incorporated by reference herein. Using the same training hologram data, the FIN model 28 and RH-M model were trained for different M values, the blind testing results of which are compared in FIG. 6. As for the internal generalization performance shown in FIG. 6, both the FIN model 28 and RH-M can successfully generalize to new lung tissue samples from new patients. However, for the external generalization to new sample types (prostate and salivary gland tissue as well as Pap smear samples), the FIN model 28 provides superior image reconstruction performance even though it uses a smaller number of trainable parameters compared to RH-M (see Table 1); in comparison, RH-M has reconstruction artifacts on external testing sets for both M=3 and M=4, also confirmed by the significantly lower SSIM values (for RH-M reconstructions) reported in FIG. 6.

In addition to its superior generalization performance, the FIN model 28 also has faster inference speed compared to deep learning-based or iterative phase retrieval algorithms. In Table 1, the inference time of FIN, RH-M, and MH-PR algorithms is compared. Noticeably, FIN has the shortest inference time among these methods using any number of raw input holograms 100. For the case of M=3, FIN is ~9.3-fold faster than RH-M and ~27.3-fold faster than MH-PR, which highlights the computational efficiency of the network. The inference speed of FIN can be further accelerated by using parallelization, which reduces the computation time to 0.04 s/mm$^2$ under an image batch size of 20 (see Table 1). It should also be noted that the number (M) of input holograms 100 has a negligible impact on the inference time of FIN, since it uses a fixed channel size for most parts of the network model, and M only affects the first 1×1 convolutional layer 36. That is why the inference times of FIN (M=3) and FIN (M=4) are approximately the same as shown in Table 1.

An end-to-end phase retrieval and hologram reconstruction network 28 is disclosed that is highly generalizable to new sample types. The trained FIN neural network 28 outperforms other phase retrieval algorithms in terms of both the reconstruction quality and speed. This method presents superior generalization capability to new types of samples 12 without any prior knowledge about these samples or any fine-tuning of its trained model. This strong external generalization of the model mainly stems from the regularization effect of the SPAF modules 30 in its architecture. In a lensfree holographic imaging system, the Fourier transforms of the fields at the sample plane and the measurement plane are related by a frequency-dependent phasor, which can be effectively learned through the element-wise multiplication module in SPAF 30. Besides, SPAF modules 30 provide a global receptive field to FIN, in contrast to the limited, local receptive fields of common CNNs. The global receptive field helps the FIN model more effectively process the holographic diffraction patterns for various samples, regardless of the morphologies and dimensions of the objects in the sample 12. In fact, previous research has already shown that end-to-end hologram reconstruction requires a larger network receptive field, which can be partially addressed by using e.g., dilated convolution. In the inventive method, the Fourier transform intrinsically captures the global spatial information of the sample 12 and thus provides a maximized receptive field for FIN, contributing to its performance gain over CNN-based hologram reconstruction models reported in FIG. 6.

Unlike fully convolutional networks, in FIN architecture, the size of the input raw hologram FOV is fixed at the beginning, i.e., a larger FOV in the testing phase cannot be used because of the element-wise multiplication in the SPAF module 30. A larger FOV raw hologram can be reconstructed using FIN by dividing the hologram into smaller FOVs and running them through the FIN-based deep neural network 28 in parallel. This parallelization of a large FOV hologram reconstruction is feasible since FIN has a significant speed advantage in its inference, and can reconstruct ~1 mm² sample area within 0.04 sec using a standard GPU (see Table 1).

Methods

Holographic Imaging: A lens-free in-line holographic microscope 50 (FIG. 1) was utilized to capture the raw holograms 100 of the specimens or samples 12. A broadband light source (WhiteLase Micro, NKT Photonics) and an acousto-optic tunable filter (AOTF) were used as the light source 16 emitting 530 nm light. The image sensor 18 was a complementary metal-oxide-semiconductor (CMOS) RGB image sensor (IMX081, Sony). The light source 16, sample 12, and the CMOS image sensor 18 were aligned vertically. The sample 12 was directly placed between the light source 16 and the image sensor 18 such that the sample-to-source distance ($z_1$) was about 10 cm, and the sample-to-sensor distance ($z_2$) ranged from 300 μm to 600 μm. The CMOS image sensor 18 was placed on and controlled by a 6-axis stage 20 (MAX606, Thorlabs) to perform lateral and axial shifts. All hardware was connected to a computer 22 and controlled by a customized LabVIEW program to capture holograms 100 automatically.

Pre-processing: The captured raw holograms 100 were firstly processed by a pixel super-resolution algorithm as described, for example, in Bishara, W. et al., Lensfree on-chip microscopy over a wide field-of-view using pixel super-resolution, Opt. Express 18, 11181-11191 (2010), which is incorporated by reference. The 6-axis stage 20 was programmed to automatically capture in-line holograms at 6×6 lateral positions with sub-pixel shifts. The super-resolution algorithm estimated the relative shifts for each hologram and merged these holograms using a shift-and-add algorithm. The effective pixel size of the generated super-resolved holograms decreases to 0.37 μm from the original CMOS pixel size of 2.24 μm. The resulting super-resolved holograms were cropped into unique patches of 512×512 pixels, without any overlap. Hologram datasets of each sample type were partitioned into training and testing sets, at a ratio of 6:1, comprising ~600 unique FOVs in each training set and ~100 FOVs for the testing set. The testing FOVs were strictly obtained from different whole slides (new patients) excluded in the training sets.

The ground truth sample fields were retrieved by an iterative multi-height (MH-PR) phase retrieval algorithm. At each sample FOV, M=8 in-line holograms were captured at different sample-to-sensor distances, which were later estimated by an autofocusing algorithm using the edge sparsity criterion as found in Zhang, Y. et al, A. Edge sparsity criterion for robust holographic autofocusing, Opt. Lett. 42, 3824-3827 (2017), which is incorporated by reference. In each iteration, the estimated sample field is digitally propagated to each hologram plane using the angular spectrum propagation. The propagated complex field is updated according to the measurement at each hologram plane, by averaging the amplitude of the propagated field with the measured amplitude and retaining the new estimated phase. One iteration is completed after all the hologram planes are used, and this MH-PR algorithm converges within 100 iterations.

Network structure: The architecture of the FIN deep neural network 28 has a Residual in Residual architecture shown in FIGS. 2A-2B to have a deeper network structure and better information flow. The deep neural network 28, FIN, consists of several SPAF modules 30 with a long skip connection 34 to form the large-scale residual connection, in conjunction with two 1×1 convolutional layers 36 at the head and tail of the network 28. Each SPAF group 32 contains two recursive SPAF modules 30, which share the same parameters to improve the network capacity without significantly enlarging the size of the network 28. In other setups, SPAF modules 30 in each SPAF group 32 may have separate parameters and more SPAF modules 30 can be entailed in one single group 32. A short skip connection 38 is introduced for every SPAF group 32 to form the middle-scale residual connection, and a small-scale residual connection 40 is used to connect the inputs and outputs of each SPAF module 30. SPAF module 30, as shown in FIG. 2B, has a linear transformation applied to the tensor after it was transformed into the frequency domain using the 2D Discrete Fourier transform, following a similar architecture as in Li, Z. et al., Fourier Neural Operator for Parametric Partial Differential Equations, 2021 Internal Conference on Learning Representations (2021), which is incorporated by reference; a half window size of k is applied to truncate the higher frequency signals, i.e., $$F'_{j,u,v} = \sum_{i=1}^{c} W_{i,j,u,v} \cdot F_{i,u,v}, u, v = 0, \pm 1, \ldots, \pm k, j = 1, \ldots, c$$

where $F \in \mathbb{C}^{c,2k+1,2k+1}$ is the truncated frequency domain representation of the input to the SFAP module after performing the 2D Discrete Fourier Transform, $W \in \mathbb{R}^{c,c,2k+1,2k+1}$ represents the trainable weights, c is the channel number, and k is the half window size. After this linear transformation, the inverse 2D Discrete Fourier transform is used to obtain the processed data back in the spatial domain, followed by a PRELU (nonlinear) activation function.

$$PReLU(x) = \begin{cases} x, & \text{if } x \geq 0 \\ ax, & \text{otherwise} \end{cases}$$

where a is a learnable parameter.

To adapt the SPAF module 30 to high-resolution image processing in a deeper network, the matrix W was shrunk allowing a significant model size reduction. The optimized linear transformation is defined as $$F'_{j,u,v} = W'_{j,u,v} \cdot \sum_{i=1}^{c} F_{i,u,v}, u, v = 0, \pm 1, \ldots, \pm k, j = 1, \ldots, c$$

where $F \in \mathbb{C}^{c,2k+1,2k+1}$ is the truncated frequency components, and $W' \in \mathbb{R}^{c,2k+1,2k+1}$ represents the trainable weights.

To further optimize the network structure for high-resolution holographic image reconstruction, a set of decreasing half window sizes (k) was chosen for the SPAF modules 30. Specifically, both of the SPAF modules 30 in each SPAF group 32 have shared hyperparameters, and a decreasing half window size k was set for the SPAF groups 32 in the sequence of the network structure, which forms a pyramid-like structure. This pyramid-like structure provides a mapping of the high-frequency information of the holographic diffraction patterns to low-frequency regions in the first few layers and passes this low-frequency information to the subsequent layers with a smaller window size, which better utilizes the features at multiple scales and at the same time considerably reduces the model size, avoiding potential overfitting and generalization issues.

Network implementation The deep neural networks 28 are implemented using PyTorch with GPU acceleration and are trained and tested on the same computer with an Intel Xeon W-2195 CPU, 256 GB memory, and NVidia RTX 2080 Ti GPUs. During the training phase, the input FOVs of 512× 512 pixels were randomly selected from the training hologram dataset, and data augmentation was applied to each FOV, which includes random image rotations of 0, 90, 180, or 270 degrees.

The training loss is the weighted sum of three different loss terms:

$$L_{loss} = \alpha L_{MAE} + \beta L_{complex} + \gamma L_{percep}$$

where $\alpha$, $\beta$, and $\gamma$ are set as 0.5, 1, and 0.5, respectively. The MAE loss and complex domain loss can be expressed as:

$$L_{MAE} = \frac{\sum_{i=1}^{n} |y_i - \hat{y}_i|}{n}$$

$$L_{complex} = \frac{\sum_{i=1}^{n} |\mathcal{F}(y) - \mathcal{F}(\hat{y})|}{n}$$

where y is the ground truth, $\hat{y}$ is the network's output, n is the total number of pixels, and $\mathcal{F}$ stands for the 2D Discrete Fourier Transform operation. For the perceptual loss term, a pre-trained VGG16 network was used as the feature extractor to minimize the Euclidean distance between the low-level features of the reconstructed images and the ground truth images.

The trainable parameters of the deep neural network models 28 are learned iteratively using the Adam optimizer and the cosine annealing scheduler with warm restarts is used to dynamically adjust the learning rate during the training phase. In the testing phase, a batch of test holograms with the same resolution (512×512 pixels) is fed to the network 28, and the inference time for one FOV at a time (batch size is set to 1) is 0.52 s/mm². Additionally, using the same Nvidia RTX 2080 Ti GPU, the inference can be parallelized with a batch size of 20, resulting in 0.04 s/mm² inference time (Table 1).

While embodiments of the present invention have been shown and described, various modifications may be made without departing from the scope of the present invention. The invention, therefore, should not be limited, except to the following claims, and their equivalents.

What is claimed is:

1. A method of performing phase recovery and holographic image reconstruction from holographic amplitude images of a test sample comprising:
obtaining one or more holographic amplitude images of the test sample at one or more sample-to-sensor distances using an image sensor; and
providing a trained deep neural network that is executed using one or more processors, wherein the trained deep neural network comprises a plurality of trained spatial Fourier transform (SPAF) modules, each SPAF module configured to perform a two-dimensional (2D) Discrete Fourier transform from a spatial domain to a frequency domain followed by a linear transformation in the frequency domain followed by an inverse 2D Discrete Fourier transform to the spatial domain, wherein the trained deep neural network is trained with holographic amplitude images obtained of a plurality of training samples at one or more sample-to-sensor distances and their corresponding in-focus phase-recovered ground truth images to optimize learnable parameters in the deep neural network, wherein the trained deep neural network is configured to receive one or more holographic amplitude images of the test sample obtained with the image sensor and outputs an in-focus complex-valued output image of the test sample that includes both phase information and amplitude information of the test sample.

2. The method of claim 1, wherein the one or more holographic amplitude images of the test sample comprises one or more raw holographic images.

3. The method of claim 1, wherein the one or more holographic amplitude images of the test sample comprises one or more pixel super-resolved holographic images.

4. The method of claim 1, wherein the test sample and the plurality of training samples are from the same or different types of samples.

5. The method of claim 1, wherein each SPAF module further comprises at least one non-linear activation function.

6. The method of claim 1, wherein each SPAF module shares the same parameters as recursive layers.

7. The method of claim 1, wherein each SPAF module uses separately optimized parameters in each layer.

8. The method of claim 1, wherein each of the one or more holographic amplitude images of the test sample comprises a larger FOV image that is divided into smaller FOVs.

9. The method of claim 8, wherein the smaller FOVs are input to one or more trained deep neural networks in parallel.

10. The method of claim 1, wherein the test sample comprises one of tissue, cells, bacteria, viruses, fungi, pathogens, pollens, model organisms, particles, particulate matter, plastics, dust, allergens, organic or inorganic materials.

11. A system for performing phase recovery and holographic image reconstruction from holographic amplitude images of a test sample comprising:
a microscopy device having a light source and an image sensor, the image sensor configured to capture one or more holographic amplitude images of the test sample at one or more sample-to-sensor distances; and
a computing device comprising one or more processors configured to execute software containing a trained deep neural network, wherein the trained deep neural network comprises a plurality of trained spatial Fourier transform (SPAF) modules, each SPAF module configured to perform a two-dimensional (2D) Discrete Fourier transform from a spatial domain to a frequency domain followed by a linear transformation in the frequency domain followed by an inverse 2D Discrete Fourier transform to the spatial domain, wherein the trained deep neural network is trained with holographic amplitude images obtained of a plurality of training samples at one or more sample-to-sensor distances and their corresponding in-focus phase-recovered ground truth images to optimize learnable parameters in the deep neural network, wherein the trained deep neural network is configured to receive the one or more holographic amplitude images of the test sample obtained with the image sensor and outputs an in-focus complex-valued output image of the test sample that includes phase information and amplitude information of the test sample.

12. The system of claim 11, wherein the test sample and the plurality of training samples are from the same or different type of samples.

13. The system of claim 11, further comprising a moveable stage configured to move the sample and/or the image sensor in one or more of the x, y, and z directions.

14. The system of claim 11, wherein each SPAF module shares the same parameters as recursive layers.

15. The system of claim 11, wherein each SPAF model uses separately optimized parameters in each layer.

16. The system of claim 13, wherein the moveable stage moves in increments in the x and y directions, and wherein the computing device further comprises image processing software configured to generate pixel super-resolved holographic images of the sample that are input to the trained deep neural network.

17. The system of claim 11, wherein each SPAF module further comprises at least one nonlinear activation function.

18. The system of claim 11, wherein each of the one or more holographic amplitude images of the test sample comprises a larger FOV image that is divided into smaller FOVs.

19. The system of claim 18, wherein the smaller FOVs are input to one or more trained deep neural networks in parallel.

20. The system of claim 11, wherein the test sample comprises one of tissue, cells, bacteria, viruses, fungi, pathogens, pollens, model organisms, particles, particulate matter, plastics, dust, allergens, organic or inorganic materials.

* * * * *